United States Patent

Bhirud et al.

[11] Patent Number: 5,827,372
[45] Date of Patent: Oct. 27, 1998

[54] AQUEOUS ALCOHOLIC AKLALINE PROCESS FOR CATIONIZATION AND ANIONIZATION OF NORMAL, WAXY, AND HIGH AMYLOSE STARCHES FROM CEREAL, LEGUME, TUBER AND ROOT SOURCES

[75] Inventors: Prakash R. Bhirud, Richmond Hill; Frank W. Sosulski, Saskatoon; Robert T. Tyler, Saskatoon; Meera Kweon, Saskatoon, all of Canada

[73] Assignee: Grain Tech Consulting, Saskatoon

[21] Appl. No.: 648,096

[22] PCT Filed: Sep. 22, 1995

[86] PCT No.: PCT/CA95/00538

§ 371 Date: Oct. 21, 1996

§ 102(e) Date: Oct. 21, 1996

[87] PCT Pub. No.: WO96/09327

PCT Pub. Date: Mar. 28, 1996

[30] Foreign Application Priority Data

Sep. 22, 1994 [CA] Canada ................................... 2132685

[51] Int. Cl.⁶ ........................... C08B 30/00; C08B 30/12; C08B 31/00; C08L 3/00
[52] U.S. Cl. .................. 127/71; 127/32; 127/33; 127/69; 127/70; 106/210; 106/213; 536/106
[58] Field of Search .................. 127/32, 33, 71, 127/70, 69; 106/210, 213; 536/106

[56] References Cited

U.S. PATENT DOCUMENTS

| | | | |
|---|---|---|---|
| 3,607,396 | 9/1971 | Germino et al. | 127/32 |
| 3,617,383 | 11/1971 | Thurston et al. | 127/71 |
| 3,912,715 | 10/1975 | Jarowenko | 260/233.3 R |
| 4,166,173 | 8/1979 | Wurzburg et al. | 536/109 |
| 4,216,310 | 8/1980 | Wurzburg et al. | 536/109 |
| 4,373,099 | 2/1983 | Hubbard et al. | 536/105 |

(List continued on next page.)

FOREIGN PATENT DOCUMENTS

| | | | |
|---|---|---|---|
| 440918 | 4/1941 | Belgium | C08B 31/16 |
| 2092141 | 9/1993 | Canada . | |
| 54-105190 | 8/1979 | Japan | C08B 31/00 |
| 56-036501 | 4/1981 | Japan | C08B 31/00 |
| 01 213302 | 8/1989 | Japan | B29C 67/22 |
| 06 100603 | 4/1994 | Japan | C08B 31/12 |

OTHER PUBLICATIONS

Carr, M.E. and Bagby, M.O. 1981. Preparation of cationic starch ether: A reaction efficiency study. *Starch* 33: 310–312 Month N/A.

Craig, S.A.S., Selb, P.A. and Jane, J. 1987. Differential scanning calorimetry properties and paper–strength improvement of cationic wheat starch. *Starch* 39: 167–170 Month N/A.

Hellwig, G. Bischoff, D. and Rubo, A. 1992. Production of cationic starch ether using an improved dry process. *Starch* 44: 69–74 Month N/A.

Hernandez, H.R. 1970. Cationic starches in high ground-wood–content paper. *TAPPI* 53 : 2101–2104 Nov. 1970.

(List continued on next page.)

Primary Examiner—Mark L. Bell
Assistant Examiner—Patricia L. Hailey
Attorney, Agent, or Firm—Murray E. Thrift; Adrian D. Battison

[57] ABSTRACT

A starch cationization process comprises suspending the starch in an aqueous alcoholic alkaline solvent containing a critical level of water (starch to water ratio 1:3 to 3:1), heating the reaction mixture for a few minutes at 30°90° C., adding a cationizing reagent such as 3-chloro-2-hydroxypropyl-trimethylammonium chloride, heating for 1–24 hours at 30°–80° C., neutralizing, centrifuging, washing and drying of the cake to yield cationic starches with degrees of substitution of 0.01 to 0.12. Amphoteric starches are produced by simultaneous or sequential reaction of an anionic reagent with or after the cationic reagent in the aqueous alcoholic alkaline solvent. Solvent recovery and concentration of effluent solids is facilitated by distillation.

18 Claims, 6 Drawing Sheets

U.S. PATENT DOCUMENTS

| | | | |
|---|---|---|---|
| 4,554,021 | 11/1985 | Harvey et al. | 106/213 |
| 4,566,910 | 1/1986 | Hubbard et al. | 127/70 |
| 4,876,336 | 10/1989 | Dirscherl et al. | 536/109 |
| 4,906,745 | 3/1990 | Bleeker et al. | 536/111 |
| 4,968,785 | 11/1990 | Dunn et al. | 536/4.1 |
| 5,059,685 | 10/1991 | Conti | 536/1.1 |
| 5,523,339 | 6/1996 | Solarek et al. | 524/47 |

OTHER PUBLICATIONS

Lim, W.J., Liang, Y.T. and Seib, P.A. 1992. Cationic oat starch preparation. *Cereal Chem.* 69: 237–239 Month N/A.

Marton, J. 1980. The role of surface chemistry in fine—cationic starch interaction. *TAPPI* 63 (4):87–91 Apr. 1980.

Marton, J. and Marton, T. 1976. Wet end starch: adsorption of starch on cellulosic fiber. *TAPPI* 59 (12):121–124 Dec. 1976.

Mazzarella, E.D. 1966. Development of cationic starches as paper coating binder. *TAPPI* 53: 526–532 Dec. 1966.

Nachtergaele, N. 1989. The benefits of cationic starches for the paper industry. *Starch* 41: 27–31 Month N/A.

Nowakowski, D., Sosulski, F.W. and Hoover, R. 1986. The effect of pin and attrition milling on starch dameageä in hard wheat flours. *Starch* 38: 253–258. Month N/A.

Valle, G.D., Colonna, P. and Tayeb, J. 1991. Use of twin screw extruder as a chemical reactor for starch cationization. *Starch* 43: 300–307 Month N/A.

Vihervaara, T., Bruun, H.H., Backman, R. and Paakkanen, M. 1990. The effect of different methods of cationization on the starch granule and its gelatinization product. *Starch* 42: 64–68 Month N/A.

Yook, C., Sosulski, F., and Bhirud, P.R. 1994. Effects of Cationization on Functional Properties of Pea and Corn Starches. *Starch* 46: 393–399 Month N/A.

Lim, S. and Seib, P.A. 1993. Preparation and posting properties of wheat and corn starch phosphates. Cereal Chem. 70:137–144. Month N/A.

AQUEOUS ALCOHOLIC AKLALINE PROCESS FOR CATIONIZATION AND ANIONIZATION OF NORMAL, WAXY, AND HIGH AMYLOSE STARCHES FROM CEREAL, LEGUME, TUBER AND ROOT SOURCES

FIELD OF THE INVENTION

The present invention relates to the production of cationic and amphoteric starches.

BACKGROUND OF THE INVENTION

As described in "Cationic Starches" and "Phosphorylated Starches", Solarek, D. B. in "Modified Starches: Properties and Uses", Wurzburg, O. B. (ed). 1986. CRC Press, Boca Raton, Fla., cationic starches are produced chemically by reacting starch with reagents containing positively charged ions to obtain derivatives such as tertiary amino and quaternary ammonium starch ethers. Cationic starches are particularly useful as wet-end additives, surface sizes and coating binders in papermaking. Cationization is often combined with anionization of the starch to improve the dispersion properties and charge balance of the starch molecules. These amphoteric starch ethers can give equivalent performance to cationic potato starch which is naturally high in phosphate groups.

Several species and biotypes of starch can be cationized effectively to provide a range of functionality for specific requirements in the paper industry. Normal and waxy corn (maize) and potato starches are the most popular starches for commercial cationization. Legume and barley starches are not available commercially in the cationized form but the results of the present investigation suggest that these cationized starches may offer certain advantages from the manufacturing and final usage viewpoint.

Cationized starch is prepared by chemical reaction of starch in a slurry or dry form in batch or continuous reactors at alkaline pH. The slurry system, employing high solids concentrations of 30–45% (Tasset U.S. Pat. No. 4,464,528, issued August, 1984), is the most common system. Unless the cationized starch slurry is used directly for papermaking, it is important that the granular structure of the starch be maintained so that the cationized starch can be recovered readily and completely by filtration or centrifugation. Starch granule swelling and gelatinization are inhibited by adding 10–30% of sodium chloride or sodium sulfate to the alkaline slurry. The chemical reaction must be carried out at no higher temperatures than 60° C. to avoid starch gelatinization. Waxy corn starch is particularly susceptible to gelatinization under alkaline conditions and high levels of gelatinization inhibitors must be used. Therefore, considerable washing of the modified starch is necessary to remove the unreacted residual reagent and gelatinization inhibitor, and effluent recovery costs are high.

The dry processes of starch cationization, as in Roerden et al U.S. Pat. No. 5,241,061, issued August, 1993, also have serious deficiencies, even though they eliminate the need for aqueous treatment and washing of the cationized starch. Reaction rates during dry cationization processes are comparatively low, requiring longer reaction times, and larger concentrations of residual cationic reagent remain in the derivatized starch. In dry cationization, the cationic groups react mainly on the starch granule surfaces and not internally as in aqueous cationization. Because the cationic substituent groups are not uniformly distributed within the starch granules, a portion of the starch, on gelatinization during papermaking, is devoid of functional cationic groups, and remains unabsorbed on the paper and, therefore, increases the eventual effluent load at the paper mill.

There is an urgent need for alternative processes wherein both normal and waxy starches can be uniformly cationized with reasonable reaction times and with minimal effluent treatment costs during manufacturing and utilization.

EXAMPLE OF COMMERCIAL PRACTICE

The current commercial practices for cationization of starch generally follow that of Yook et al. (Effects of cationization on functional properties of pea and corn starches. Yook, C.; Sosulski, F. and Bhirud, P. R. 1994, Starch/Stärke, 46, 393–399) who prepared cationic corn and pea starches at four levels of substitution. For each treatment, 50.0 g sodium sulfate and 2.8 g (0.07 moles) NaOH pellets were added to 133 ml distilled water and dissolved. The solution was poured into a 250 ml bottle containing 81.0 g, dry basis, starch, and the slurry was shaken for 5 min. in a constant-temperature water bath at 50° C. The starch concentration in the slurry was 35% (starch/starch+water basis). The cationizing agent was an aqueous solution of 3-chloro-2-hydroxypropyltrimethylammonium chloride (CHPTAC) with 60% (w/w) active monomer concentration. The cationizing agent was admixed with each starch slurry during 1 min. at concentrations of 0.0, 3.0, 6.0 or 7.5 ml, after which the reaction was allowed to proceed at 50° C. for 6 hours, followed by neutralization with 1N HCl. The slurry was filtered and the modified starches were washed four times with 500 ml distilled water, followed by air-oven drying at 30° C. and milling. The process provided a relatively high degree of accuracy and precision (Table 1), and degrees of substitution (DS) levels of 0.0, 0.02, 0.04 and 0.05 were obtained for the corn and pea starches.

TABLE 1

The degrees of substitution (DS) of native and cationic corn and pea starches

| Application of | DS = Number of cationic groups/glucose unit | | |
|---|---|---|---|
| CHPTAC, ml | Expected | Corn starch | Pea starch |
| 0.0 | 0.00 | 0.000 | 0.000 |
| 3.0 | 0.02 | 0.020 | 0.021 |
| 6.0 | 0.04 | 0.039 | 0.042 |
| 7.5 | 0.05 | 0.055 | 0.050 |

SUMMARY

The objectives of this invention are to provide an improved series of processes for the manufacture of cationic and amphoteric starches from normal, waxy and high amylose biotypes of cereal grains, legume seeds, tubers and roots.

According to the present invention there is provided a method for the cationization of starch comprising mixing the starch with a liquid and cationizing the starch in the said mixture under alkaline conditions, characterized in that the liquid is a mixture comprising water and a non-aqueous, water miscible solvent.

To aid in the diffusion of the chemical reagent into the granule and to catalyse the cationization reaction, part of the process is conducted in an aqueous medium. The degree of water absorption by the granule, and the associated granule swelling, are mediated by the temperature of the starch slurry. The invention is based on the principle that it is not necessary to use a completely aqueous medium for cationization since starches only absorb a certain level of moisture, in proportion to the degree of heating which is usually not permitted to exceed 55° to 60° C. The present proposal is to use only sufficient moisture so that the starch granule takes up water and swells to the extent needed to facilitate the diffusion of cationizing reagent into the starch granule. An appropriate range for the starch/water ratio is from 1:3 to 3:1 (w/w). The non-aqueous but water miscible solvent is used as diluent to facilitate mixing of the slurry and, hence, the diffusion of cationizing reagent into the starch granule.

The solvent may be an organic solvent, preferably an alcohol, for example ethanol, 1-propanol, 2-propanol or methanol.

It is desirable that the solvent be miscible with water and of low boiling point in order that solvent recovery can be achieved at relatively low cost, and to facilitate recovery of excess cationizing reagent in a more concentrated form. Previously organic solvents have only been used indirectly as the cationizing medium, as in Tessler, U.S. Pat. No. 4,060,683, issued November, 1977.

Where the starch is a waxy starch, the liquid mixture can include the water, the solvent and an alkali, and be characterised by the absence of a further gelatinization inhibitor. The organic solvent serves as gelatinization inhibitor, replacing the need for added salts.

The cationization of the starch may be combined with other chemical modifications of the starch that introduce anionic groups into the same starch molecules in the intact granule. Thus, the invention provides a method of producing amphoteric starch that comprises carrying out the above described cationization method and also anionizing the starch in the liquid mixture.

Proposals have been made (Harvey et al. U.S. Pat. No. 4,566,910, issued January, 1986) for direct phosphorylation of alkaline starch pastes at 45° to 95° C., with or without cationizing reagent, but gelatinization would need to be controlled if the final product is recovered in the dry form. In traditional methods for preparing amphoteric starches (Dirscherl et al. U.S. Pat. No. 4,876,336, issued October, 1989), drying (moisture content <15%) and heating (110°–160° C., 1–5 hours) steps are required for phosphorylation of cationized starch. However, when the present cationization process is combined with phosphorylation, starches can be reacted with the cationizing reagent and phosphate salts simultaneously or sequentially in the aqueous alcoholic alkaline solvent without the intermediary steps of drying and heating. Thus, a high reaction efficiency of amphoteric starch synthesis is achieved with the associated saving of time and at a lower cost. This modified method for preparing amphoteric starch is another application of the present invention that embodies the use of the aqueous alcoholic alkaline process for modification of native starches.

DETAILED DESCRIPTION

Experiment

Figure 1:
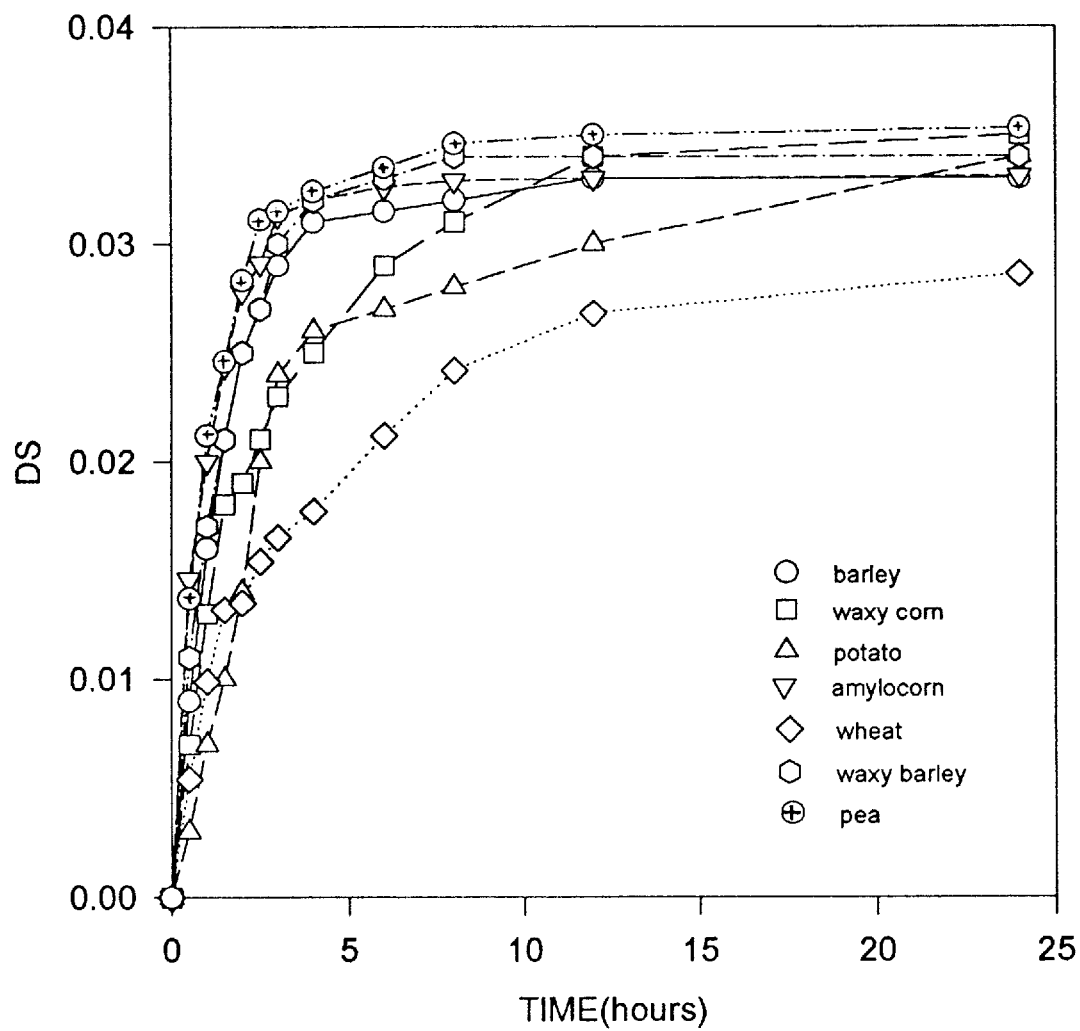
FIG. 1 is a graph showing degrees of substitution in starch species and biotypes during cationization by the aqueous alcoholic alkaline procedure during 24 hours of incubation.

Effect of gelatinization inhibitor, sodium sulphate, on cationization of corn, pea, and waxy corn starches by the proposed aqueous alcoholic alkaline process Corn, pea and waxy corn starches were used and the starch to water ratio was 1:1. The experiments were performed with and without addition of 30.8 g sodium sulphate. Water and the non-aqueous miscible solvent, ethanol, were used as shown in Table 2. The aqueous alkaline treatment was prepared by adding the sodium sulphate to 1.7 g NaOH in 82 ml distilled water before adding to the starch as described below.

The aqueous alcoholic alkaline solution was prepared by dissolving 1.7 g NaOH in 44.2 ml of distilled water to which 123.4 ml of 100% ethanol were added. Then the solution was added to the starch, 50.0 g (dry basis), weighed in a 250 ml centrifuge bottle, and mixed thoroughly before incubating again at 50° C. for 10 min. Then 4.2 ml of 60% 3-chloro-2-hydroxypropyltrimethylammonium chloride (CHPTAC) solution were added to the starch slurry during 1 min. The reaction mixture was incubated for 0–24 hours in a shaker bath at 50° C. At specific time intervals a portion of the mixture was removed, neutralized with 3N HCl in distilled water or 100% ethanol, depending on the solvent system, filtered immediately on a sintered glass crucible and washed three times with 25 ml of distilled water or 95% ethanol. The samples were air dried overnight in a fumehood.

The degree of substitution (DS) was determined by measuring the increase in nitrogen content in the derivatized starches compared to the original starch.

Under strictly aqueous conditions, corn, pea and waxy starches showed substantial degrees of gelatinization of the granules, especially for waxy corn starch (Table 2). In the presence of the aqueous alcoholic alkaline solvent, cationization was particularly effective, especially for waxy starch in the absence of the gelatinization inhibitor, sodium sulfate. The ethanol itself acted as a gelatinization inhibitor as well as facilitating the diffusion of CHPTAC into the interior of all starch granule species.

TABLE 2

Degrees of substitution of three starch species and biotypes after 6 hours incubation with CHPTAC in two alkaline solvent systems with and without gelatinization inhibitor.

| Gelatinization inhibitor | Aqueous solvent | | | Aqueous alcoholic solvent | | |
| --- | --- | --- | --- | --- | --- | --- |
| | Corn | Pea | Waxy Corn | Corn | Pea | Waxy Corn |
| None | 0.032* | 0.034* | 0.018** | 0.037 | 0.036 | 0.040 |
| $Na_2SO_4$ | 0.036 | 0.031 | 0.034 | 0.035 | 0.034 | 0.029 |

*Partial gelatinization of the starch granule occurred.
**Severe gelatinization occurred.

Experiment 2

Effect of organic solvent and solvent concentration on the cationization efficiency of the aqueous alcoholic alkaline process The objective of this study was to determine the optimum concentrations of several alcoholic solvents (ethanol, 2-propanol and methanol) on the aqueous alcoholic alkaline cationization process. DS values were determined as before on cationized corn, pea, barley and waxy barley starches at 84, 75, 65, 55, 45, 35, 25 and 15% alcohol relative to total alcohol plus water. The samples were native corn starch and native pea starch from commercial sources and laboratory-prepared normal and waxy barley starches. The reactants were 50.0 g starch, 4.2 ml CHPTAC (0.05M), 1.7 g NaOH and sufficient distilled water (41.7 to 44.1 9) to give a starch to water ratio of 1:1. The alcoholic additions were 258.6, 150.0, 92.9, 61.1, 40.9, 26.9, 16.7 and 8.8 ml of 100% alcohol to achieve the concentrations of 84, 75, 65, 55, 45, 35, 25 and 15%. The reactions were conducted at 50° C. for 0–24 hours of incubation.

For corn starch, the levels of DS achieved after 6 hours of incubation with CHPTAC in ethanol were high over the range of 75 to 15% alcohol but the 25% and 15% samples were thick, and difficult to mix and sample for analysis (Table 3). Therefore, other starch sources were only tested over the 84 to 35% range of alcohol concentrations. Similar satisfactory rates of cationization were obtained with ethanol at the 75 to 35% ethanol concentrations for pea, waxy barley and barley. The best results were recorded for 65% ethanol for each starch source.

Results with 2-propanol were more variable than with ethanol where 65–55% alcohol was optimal for corn starch, and 45–35% alcohol were best for pea and waxy barley (Table 3). Certainly 2-propanol was as effective in cationization as ethanol. Methanol was nearly as effective as ethanol and 2-propanol.

It should be noted that addition of 100% alcohol is only used for convenience to achieve the desired water to alcohol ratio. By adjusting the level of water to alcohol, it is possible to use 95%, 90%, 85%, 80%, etc., concentrations of alcohol in making up the slurries depending on cost and availability.

TABLE 3

Effect of alcoholic solvent and decreasing alcohol concentration in the reaction mixture during incubation with CHPTAC on the DS of four starches

| Starch species | Concentration of alcohol, % of total solvents | | | | | | | |
|---|---|---|---|---|---|---|---|---|
| | 84 | 75 | 65 | 55 | 45 | 35 | 25 | 15 |
| Ethanol | | | | | | | | |
| Corn | 0.022 | 0.033 | 0.036 | 0.031 | 0.030 | 0.030 | 0.033 | 0.032 |
| Pea | 0.026 | 0.032 | 0.034 | 0.030 | 0.030 | 0.029 | — | — |
| WB | 0.028 | 0.029 | 0.033 | 0.029 | 0.030 | 0.030 | — | — |
| B | 0.031 | 0.031 | 0.031 | 0.029 | 0.028 | 0.029 | — | — |
| 2-Propanol | | | | | | | | |
| Corn | 0.036 | 0.034 | 0.036 | 0.037 | 0.032 | 0.033 | — | — |
| Pea | 0.027 | 0.028 | 0.028 | 0.026 | 0.029 | 0.029 | — | — |
| WB | 0.031 | 0.034 | 0.033 | 0.034 | 0.036 | 0.036 | — | — |
| B | 0.021 | 0.023 | 0.025 | 0.028 | 0.027 | 0.028 | — | — |
| Methanol | | | | | | | | |
| Corn | 0.031 | 0.031 | 0.031 | 0.029 | 0.028 | 0.029 | — | — |
| Pea | 0.014 | 0.022 | 0.025 | 0.025 | 0.027 | 0.027 | — | — |
| WB | 0.021 | 0.024 | 0.029 | 0.029 | 0.029 | 0.030 | — | — |
| B | 0.017 | 0.023 | 0.025 | 0.026 | 0.028 | 0.029 | — | — |

WB = Waxy barley, B = Barley

Experiment 3

Effect of moisture content in the reaction mixture on cationization of corn and pea starches by the proposed aqueous alcoholic alkaline process The method was similar to Experiment 2 in which the 65% ethanol level was adopted, but the starch to water ratio of 3:1 was compared with the previous 1:1 ratio. The procedure was as follows.

Starch, 50.0 g (dry basis), was weighed in a 250 ml centrifuge bottle. An alkaline alcoholic solution was prepared by dissolving 1.7 g NaOH in sufficient distilled water to give a starch to water ratio of 1:1 or 3:1, to which 92.9 or 31.0 ml, respectively, of 100% ethanol were added and incubated at 50° C. for 10 min. The solution was added to the weighed starch and mixed thoroughly before incubating again at 50° C. for 10 min. Then 4.2 ml of 60% CHPTAC solution were added to the starch slurry during 1 min. The reaction mixture was incubated for 0–24 hours in a shaker bath at 50° C. At specific time intervals a portion of the mixture was removed, neutralized with 3N HCl in 100% ethanol, filtered immediately on a sintered glass crucible and washed three times with 25 ml of 95% ethanol. The samples were air dried overnight in a fume-hood. The DS was determined by measuring the nitrogen content in the derivatized starches.

The results are shown in Table 4. The rate of cationization was very slow at low moisture content of 3:1 starch to water, much lower than at the 1:1 ratio. Since swelling of starch was essential for migration of cationizing reagent into the starch granule, the lowering of moisture content in the reaction mixture appeared to severely restrict the extent of starch swelling and, consequently, the diffusion rate of cationizing reagent into the starch granule. The optimum moisture content would also be influenced by the temperature of the reaction because temperature influences the swelling and diffusion constant of water into starch, as well as of the cationizing agent.

Detailed studies can be conducted needed to determine the minimum effective moisture content of the reaction mixture for cationization; it is anticipated that the level would differ for each starch species. In initial studies, moisture additions above the starch to water ratio of 1:1 did not improve the cationization rate substantially. It was observed that the water absorptions of native pea and corn starches were about 110%, as determined by adding excess water to the starch, stirring and then centrifuging to remove the excess water. So, for the present studies, the starch/water ratio was established at 1:1. Again it should be noted that any concentration of alcohol, not necessarily 100% alcohol, may be used so long as the mixture of water and alcohol is of the desired ratio.

TABLE 4

Effect of the moisture content in the reaction mixture on cationization of corn and pea starches by the aqueous alcoholic alkaline process

| Time of Incubation, | DS at starch to water ratio of | | | |
|---|---|---|---|---|
| | 1:1 | | 3:1 | |
| hours | Corn | Pea | Corn | Pea |
| 0.0 | 0.000 | 0.000 | 0.000 | 0.000 |
| 0.5 | 0.014 | 0.014 | 0.000 | 0.001 |
| 1.0 | 0.021 | 0.021 | 0.001 | 0.002 |
| 1.5 | 0.026 | 0.025 | 0.003 | 0.003 |
| 2.0 | 0.029 | 0.028 | 0.003 | 0.003 |
| 2.5 | 0.032 | 0.031 | 0.004 | 0.004 |

TABLE 4-continued

Effect of the moisture content in the reaction mixture on cationization of corn and pea starches by the aqueous alcoholic alkaline process

| Time of Incubation, | DS at starch to water ratio of | | | |
|---|---|---|---|---|
| | 1:1 | | 3:1 | |
| hours | Corn | Pea | Corn | Pea |
| 3.0 | 0.033 | 0.032 | 0.004 | 0.004 |
| 4.0 | 0.034 | 0.033 | 0.004 | 0.005 |
| 6.0 | 0.036 | 0.034 | 0.005 | 0.008 |
| 8.0 | 0.037 | 0.035 | 0.006 | 0.009 |
| 12.0 | 0.037 | 0.035 | 0.006 | 0.010 |
| 24.0 | 0.038 | 0.035 | 0.006 | 0.011 |

Experiment 4

Effect of CHPTAC concentration on rate of cationization of corn and pea starches The paper industry requires a range of cationization levels for the various applications in paper manufacture, and the ability of the aqueous alcoholic alkaline process to prepare these levels accurately must be demonstrated. Two common DS levels for commercial cationized starches are DS 0.03 and 0.05. CHPTAC concentrations of 0.05M (mole.mole$^{-1}$ starch) and 0.1M were prepared and added to the reaction mixtures as described in Experiment 3 at a constant total water basis. The other conditions were maintained as in Experiment 3 and the starch to water ratio was 1:1.

At 0.05M CHPTAC, corn and pea starches reached DS 0.03 at about 2.5 hours (Table 5). By using 0.10M CHPTAC, the corn and pea starches reached DS 0.05 in about 2 hr. Doubling the CHPTAC concentration essentially doubled the reaction rate, and higher final cationizations levels were achieved over the same reaction period.

TABLE 5

Effect of concentration of CHPTAC reagent on the rate of cationization of corn and pea starches using the aqueous alcoholic alkaline process

| Time of Incubation, | DS at starch to water ratio of 1:1 | | | |
|---|---|---|---|---|
| | 0.05 M CHPTAC | | 0.10 M CHPTAC | |
| hours | Corn | Pea | Corn | Pea |
| 0.0 | 0.000 | 0.000 | 0.000 | 0.000 |
| 0.5 | 0.014 | 0.014 | 0.024 | 0.021 |
| 1.0 | 0.021 | 0.021 | 0.033 | 0.033 |
| 1.5 | 0.026 | 0.025 | 0.042 | 0.043 |
| 2.0 | 0.029 | 0.028 | 0.049 | 0.054 |
| 3.0 | 0.033 | 0.032 | 0.057 | 0.058 |
| 4.0 | 0.034 | 0.033 | 0.060 | 0.060 |
| 6.0 | 0.036 | 0.034 | 0.066 | 0.062 |
| 8.0 | 0.037 | 0.035 | 0.067 | 0.063 |
| 12.0 | 0.037 | 0.035 | 0.068 | 0.064 |
| 24.0 | 0.038 | 0.035 | 0.068 | 0.065 |

Experiment 5

Application of the aqueous alcoholic alkaline cationization process to several starch species Samples of waxy corn, amylocorn, pea, barley, waxy barley, wheat and potato starches were cationized by the same procedure as described in Experiment 3 using a starch:water ratio of 1:1 and CHPTAC concentration of 0.05M.

The results are presented in FIG. 1. The process gave excellent results for normal barley, amylocorn, pea and waxy corn, as was shown earlier for normal corn starch. Potato, waxy barley and wheat starches gave somewhat lower DS values. In general, the process gave satisfactory results with a wide range of species and biotypes of starch.

Experiment 6

Applicability of the proposed aqueous alcoholic alkaline process to wary starches Since the cationization of waxy starch requires the presence of gelatinization inhibitors, the aqueous alcoholic alkaline process was evaluated specifically for cationization of waxy starches. Basically the method of cationization was same as in Experiment 3 in which the gelatinization inhibitor, sodium sulfate, was excluded from the reaction mixture, and the starch to water ratio was maintained at 1:1. Commercial normal and waxy corn starches were used but it was necessary to extract and refine normal and waxy barley starches in the laboratory.

The reaction rates for cationization of both native waxy corn and native waxy barley starches were comparable to those of native normal starch controls (Table 6). Therefore, the aqueous alcoholic alkaline process was an attractive alternative to conventional aqueous cationization processes since no additional gelatinization inhibitors were required in the presence of the organic solvent.

TABLE 6

Effect of aqueous alcoholic alkaline process on cationization of native waxy corn and native waxy barley starches in comparison with normal starch controls

| Time of Incubation, | DS at starch to water ratio of 1:1 | | | | |
|---|---|---|---|---|---|
| | Commercially-prepared corn starches | | | Lab-prepared barley starches | |
| hours | Normal | Waxy 1 | Waxy 2 | Normal | Waxy |
| 0.0 | 0.000 | 0.000 | 0.000 | 0.000 | 0.000 |
| 0.5 | 0.014 | 0.007 | 0.010 | 0.009 | 0.011 |
| 1.0 | 0.021 | 0.013 | 0.013 | 0.016 | 0.017 |
| 1.5 | 0.026 | 0.018 | 0.018 | 0.021 | 0.021 |
| 2.0 | 0.029 | 0.019 | 0.019 | 0.025 | 0.025 |
| 2.5 | 0.032 | 0.021 | 0.021 | 0.027 | 0.027 |
| 3.0 | 0.033 | 0.025 | 0.025 | 0.030 | 0.030 |
| 4.0 | 0.034 | 0.025 | 0.029 | 0.031 | 0.032 |
| 6.0 | 0.036 | 0.029 | 0.030 | 0.031 | 0.033 |
| 8.0 | 0.037 | 0.031 | 0.031 | 0.032 | 0.034 |
| 12.0 | 0.037 | 0.034 | 0.033 | 0.033 | 0.034 |
| 24.0 | 0.038 | 0.035 | 0.034 | 0.033 | 0.034 |

Experiment 7

Application of the aqueous alcoholic alkaline cationization process in preparing amphoteric starches.

Figure 4:
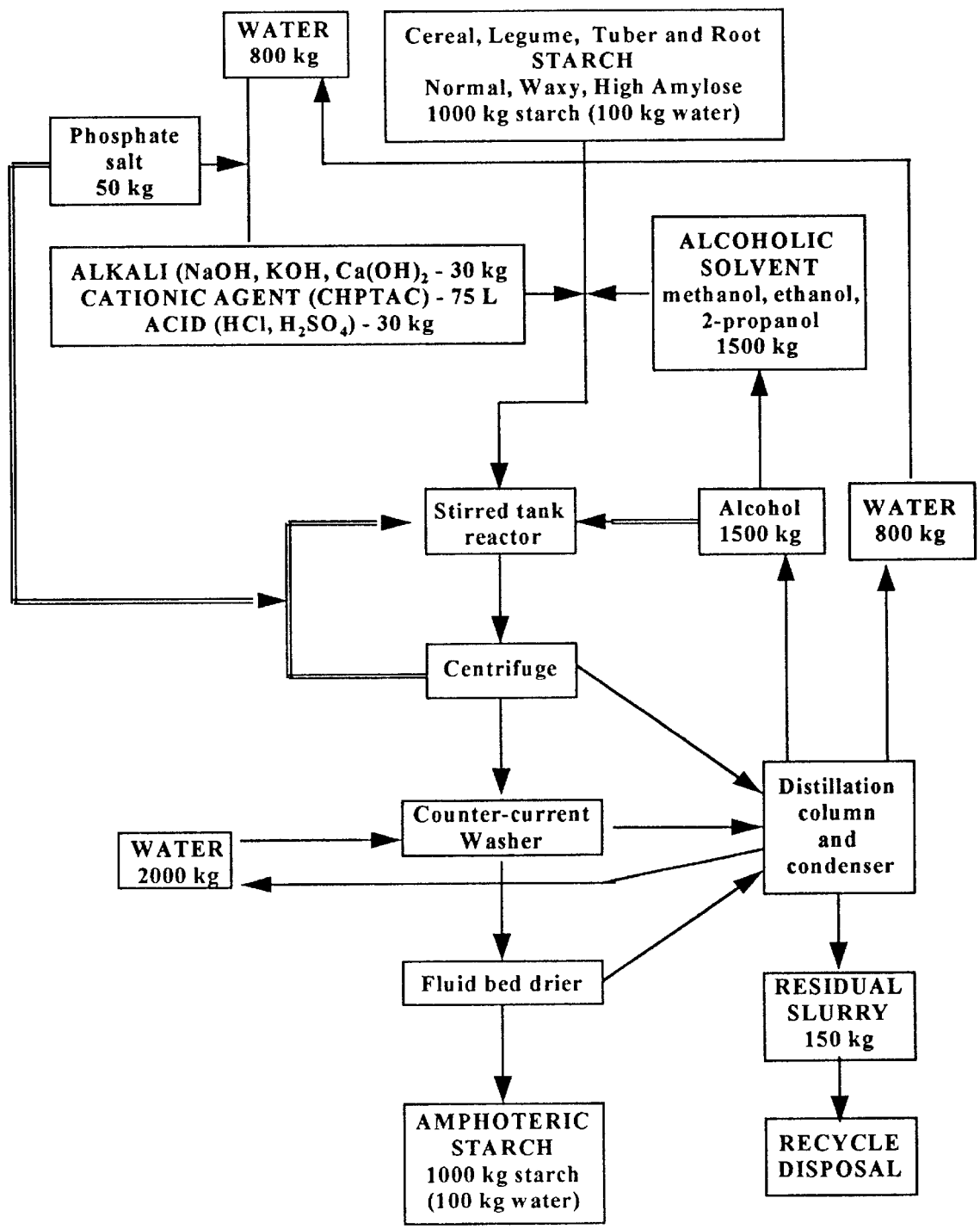
FIG. 4 is a block diagram showing the material balance for one tonne of starch cationized and phosphorylated by the aqueous alcoholic alkaline procedure based on a simultaneous or sequential reaction system.

Amphoteric starches are prepared by combining cationization and phosphorylation. Phosphate groups, as anionic substituent groups, are usually introduced by conventional phosphorylation which consists of drying the cationized starch before heating to complete the phosphorylation reaction. In the aqueous alcoholic alkaline process described herein, amphoteric starches can be prepared by simultaneous or sequential processes (FIG. 4). The source of phosphate groups may be tripolyphosphate, hexametaphosphate or pyrophosphate alkali metal salts.

Figure 5:
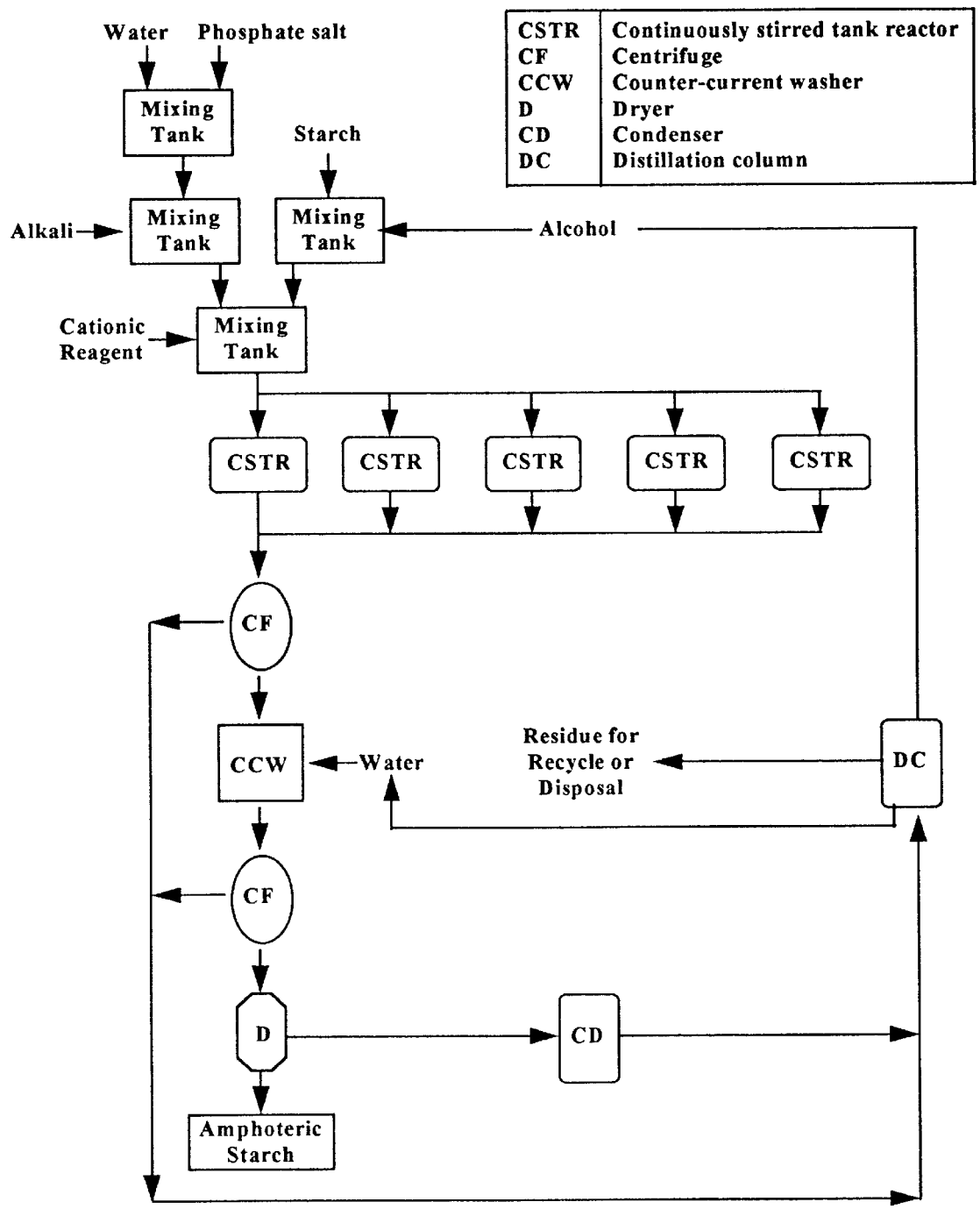
FIG. 5 is a flow chart for the aqueous alcoholic alkaline cationization and phosphorylation of starch by a simultaneous reaction system illustrating the most effective mixing sequence and equipment for the process.

In the simultaneous process (FIG. 5), 2.5 g of sodium tripolyphosphate was dissolved in sufficient distilled water to give a starch to water ratio of 1:1 and 1.7 g NaOH was added. Absolute ethanol 92.9 ml was added to preweighed starch (50.0 g, dry basis) and the alkaline phosphate solution was added to the starch slurry, and mixed thoroughly before incubation at 50° C. for 10 min. Then 4.2 ml of CHPTAC were added to the starch slurry. The reaction mixture was incubated for 3 hours in a 50° C. water bath with constant shaking. After reaction, reaction mixture was neutralized with 3N HCl, centrifuged at 8,000 rpm for 15 min. and the supernatant discarded. The starch pellet was washed two times with distilled water and one time with 95% ethanol, and then air-dry.

Figure 6:
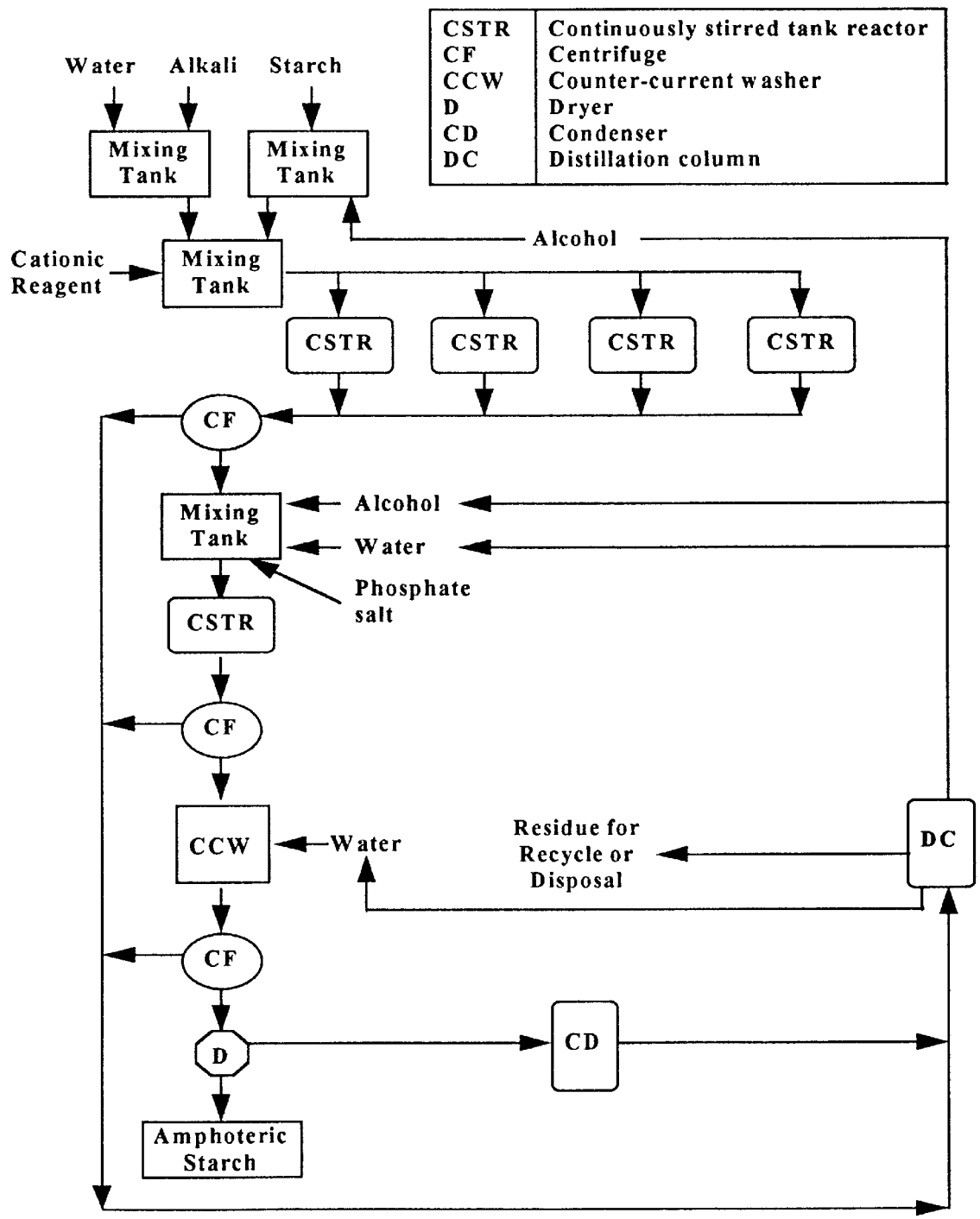
FIG. 6 is a flow chart for the aqueous alcoholic alkaline cationization and phosphorylation of starch by a sequential reaction system illustrating the mixing sequence and equipment required for the process.

In the sequential process (FIG. 6), starch was cationized initially as in experiment 3 and centrifuged at 12,500 rpm for 30 min. The supernatant was discarded and 2.5 g of sodium tripolyphosphate were dissolved in 20 ml of distilled water. The phosphate salt solution was added to the starch pellet and 92.9 ml of 100% ethanol was added and the slurry was mixed thoroughly. The starch mixture was then incubated at 50° C. for 1 hour. The reacted starch mixture was neutralized with 3N HCl and washed as above, followed by air drying.

Nitrogen content was measured by the Kjeldahl method to measure the cationic groups. The phosphorous content and anionic group were measured by colorimetry. The DS values of the groups were then calculated.

The DS of anionic and cationic groups in amphoteric corn, pea, barley, waxy barley and waxy corn starches, prepared by the two modifying methods, are given in Table 7. All of the amphoteric starches exhibited the appropriate DS values for anionic and cationic groups as required by the paper industry. These processes can be used on all species and biotypes of starch including normal and waxy starches. DS values for anionic group in amphoteric potato starch were higher than for other starches because potato starch contains, naturally, 0.07 to 0.09% phosphorous covalently bound to the amylopectin fraction of the starch (Solarek, supra).

TABLE 7

DS values of anionic and cationic groups in amphoteric corn, pea, barley, potato, wheat, waxy barley and waxy corn starches prepared by simultaneous and sequential processes.

| Starch | Anionic group | | Cationic group | |
|---|---|---|---|---|
| | % P | DS | % N | DS |
| Simultaneous process | | | | |
| Corn | 0.33 | 0.017 | 0.28 | 0.033 |
| Pea | 0.31 | 0.016 | 0.28 | 0.033 |
| Barley | 0.27 | 0.014 | 0.25 | 0.031 |
| Potato | 0.43 | 0.022 | 0.27 | 0.032 |
| Wheat | 0.29 | 0.015 | 0.32 | 0.038 |
| Waxy Barley | 0.30 | 0.016 | 0.27 | 0.032 |
| Waxy Corn | 0.37 | 0.020 | 0.30 | 0.036 |
| Sequential process | | | | |
| Corn | 0.33 | 0.017 | 0.27 | 0.032 |
| Pea | 0.33 | 0.017 | 0.29 | 0.034 |
| Barley | 0.29 | 0.015 | 0.25 | 0.031 |
| Potato | 0.55 | 0.029 | 0.26 | 0.031 |
| Wheat | 0.33 | 0.017 | 0.25 | 0.031 |
| Waxy Barley | 0.33 | 0.017 | 0.28 | 0.033 |
| Waxy Corn | 0.41 | 0.022 | 0.33 | 0.039 |

Mass Balance

Figure 2:
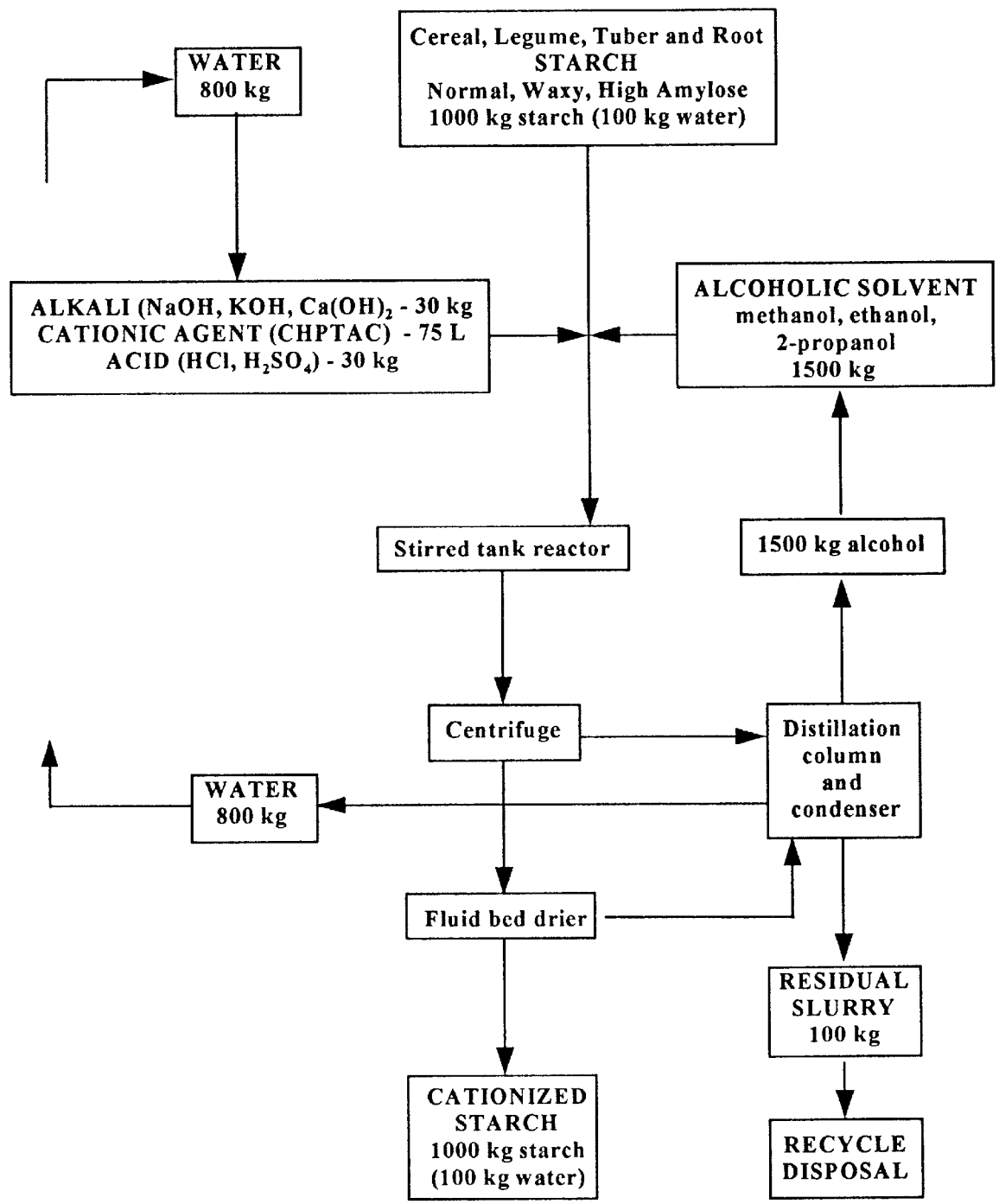
FIG. 2 is a block diagram showing the material balance for one tonne of starch cationized by the aqueous alcoholic alkaline procedure, showing solvent recycling and reagent recovery.
Figure 3:
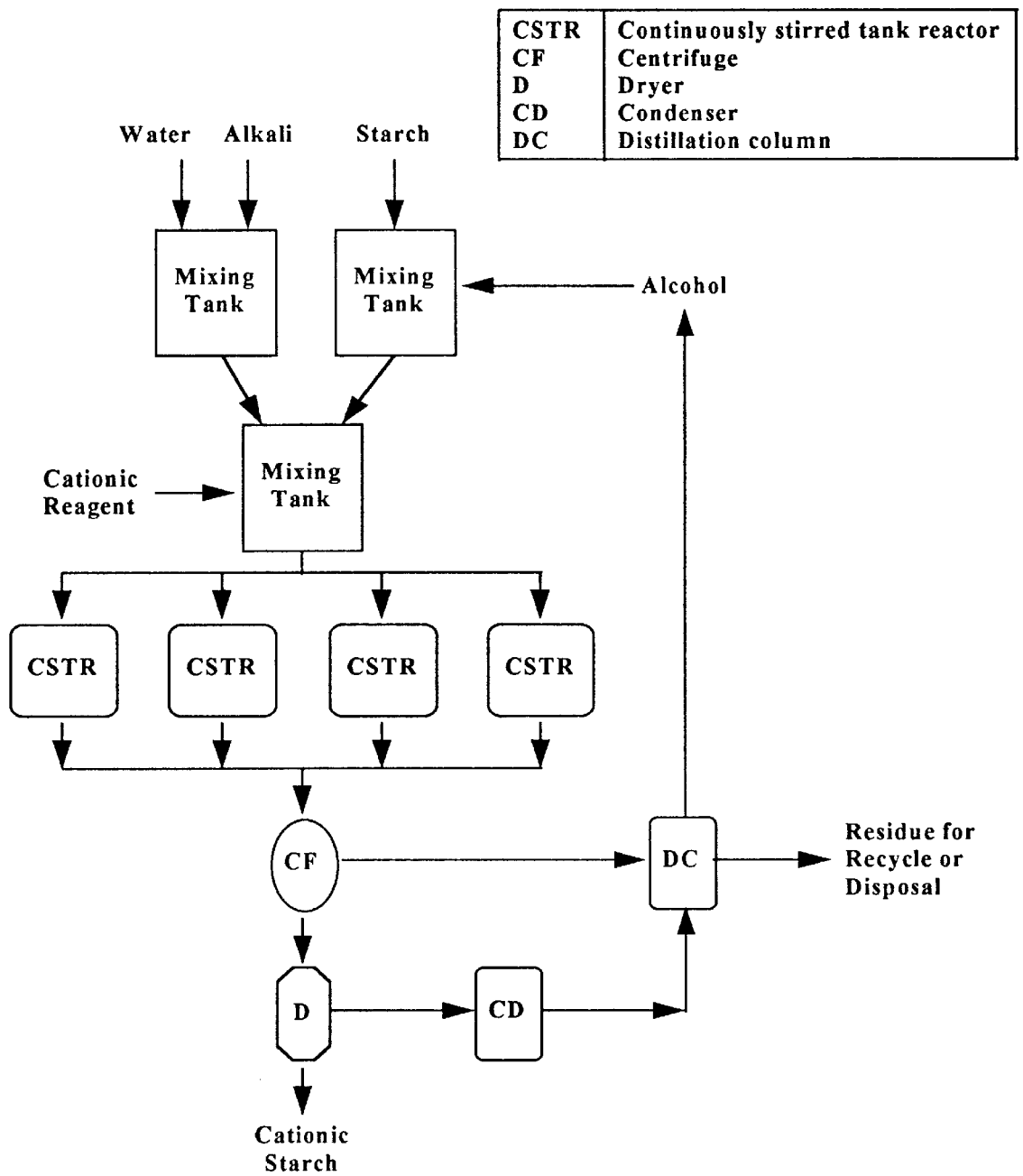
FIG. 3 is a flow chart for a batch or continuous system of cationizing by the aqueous alcoholic alkaline cationization process, showing the most effective sequence for mixing the reagents and identifying the basic types of equipment employed in the system.

Without estimation of process losses, the raw material of 1000 kg starch containing 100 kg water would be converted into the final product, cationized starch, in approximately the same yield (FIG. 2). Other water added directly or via reagents, 800 kg, would be vaporized in the drier and condensed for recycling or disposal. The liquid phase from the centrifuge and the miscella from the countercurrent starch washer would be distilled and condensed to separate 95% alcohol from the aqueous phase for recycling to the stirred tank reactor. The residual aqueous slurry from the distillation column would contain the excess cationizing reagent, salts and other solubles arising from the raw material. The positively charged cationizing reagent could be recovered on an ion exchanger. The other waste materials such as NaCl would not represent a serious disposal problem.

A comparable aqueous cationizing plant would generate about 3500 kg of effluent from the centrifuge and countercurrent washer. Because of the higher boiling point of water (100°C.) compared to ethanol (78°C.) and a much higher solids load of over 600 kg of $Na_2SO_4$, the gelatinization inhibitor, the recycling and disposal costs would exceed those of the aqueous alcoholic alkaline process.

Application Of Cationic Starches In Paper Making

The effects of the aqueous alcoholic alkaline process for cationization on starch performance as an internal binder in paper-making was determined in comparison with a commercial cationized corn starch.

In Tables 8–11, Cato 15 is a commercial cationized (amphoteric) corn starch that is commonly used in paper-making. There is also a non-starch treated control. Corn, pea and waxy barley starches were cationized in the laboratory at low and high DS levels and subjected to the standard tests for internal binders in paper. Without dealing with specific differences, the ratings in Table 8 show the superiority of Cato 15 over the non-starch control (126.5 vs. 100.0), and the aqueous cationized laboratory samples (129.0–137.6) over the Cato 15 (126.5) result. The data in Table 9 show that starches prepared by the aqueous alcoholic alkaline cationization process (127.0–132.4) are comparable to those prepared by the traditional aqueous method including amphoteric corn starch (129.0–137.6).

TABLE 8

Effect of aqueous cationization of corn and pea starches as internal binder on paper quality as compared to a non-starch control and Cato 15[a].

| Treatment and DS | Basis weight g. m$^{-1}$ | Break- ing length m | Tensile index N. m. g$^{-1}$ | Burst index k Pa. m$^2$ per g | Scott bond ft. lb | Rat- ing[b] |
|---|---|---|---|---|---|---|
| No starch added | | | | | | |
| Control | 73.5 | 5806 | 56.9 | 2.39 | 109 | 100.0 |
| Starch added to 0.91% level (20 lb. ton$^{-1}$ dry fiber) | | | | | | |
| Cato 15 (0.035) | 72.4 | 6725 | 66.0 | 3.05 | 177 | 126.5 |
| Corn (0.031) | 71.6 | 6985 | 68.5 | 3.24 | 193 | 133.5 |
| Corn (0.053) | 74.4 | 6628 | 65.0 | 3.08 | 197 | 129.0 |
| Pea (0.026) | 72.1 | 7578 | 74.3 | 3.12 | 170 | 135.0 |
| Pea (0.046) | 72.6 | 6976 | 68.4 | 3.27 | 218 | 137.6 |

[a]All values are averages of ten determinations.
[b]Rating is calculated by assigning weight to all test parameters excluding basis weight.

TABLE 9

Effect of aqueous cationization of starch as internal binder on tensile energy absorption yield stress (TEAYS) of paper as compared to a non-starch control and Cato 15[a]

| Treatment and DS | Elongation at break inch | Strain at break % | Energy at break inch-lb. | TEAYS psi |
|---|---|---|---|---|
| No starch added | | | | |
| Control | 0.095 | 2.38 | 0.95 | 4591 |
| Starch added to 0.91% level (20 lb. ton$^{-1}$ dry fiber) | | | | |
| Cato 15 (0.035) | 0.135 | 3.38 | 1.48 | 4761 |
| Corn (0.031) | 0.123 | 3.08 | 1.39 | 5371 |
| Corn (0.053) | 0.146 | 3.65 | 1.62 | 5054 |
| Pea (0.026) | 0.106 | 2.64 | 1.29 | 6000 |
| Pea (0.046) | 0.129 | 3.23 | 1.49 | 5509 |

[a]All values are averages of ten determinations.

TABLE 10

Effect of aqueous alcoholic alkaline cationization of corn, pea and waxy barley starches as internal binder on paper quality as compared to a non-starch control and Cato 15[a]

| Treatment and DS | Basis weight g. m$^{-1}$ | Breaking length m | Tensile index N. m. g$^{-1}$ | Burst index k Pa. m$^2$ per g | Scott bond ft. lb | Rating[b] |
|---|---|---|---|---|---|---|
| No starch added | | | | | | |
| Control | 73.5 | 5806 | 56.9 | 2.39 | 109 | 100.0 |
| Starch added to 0.91% level (20 lb. ton$^{-1}$ dry fiber) | | | | | | |
| Cato 15 (0.035) | 72.4 | 6725 | 66.0 | 3.05 | 177 | 126.5 |
| Corn (0.033) | 71.7 | 7250 | 71.1 | 2.99 | 156 | 128.1 |
| Corn (0.051) | 72.4 | 6909 | 67.8 | 3.20 | 193 | 132.4 |
| Pea (0.036) | 71.9 | 6213 | 60.9 | 2.93 | 167 | 118.6 |
| Pea (0.053) | 70.1 | 6754 | 66.2 | 3.01 | 181 | 127.0 |
| WB[c](0.051) | 71.5 | 7090 | 69.5 | 3.30 | 230 | 132.0 |

[a]All values are averages of ten determinations.
[b]Rating is calculated by assigning equal weight to all test parameters excluding basis weight.
[c]Waxy barley.

TABLE 11

Effect of aqueous alcoholic alkaline cationization of starch as internal binder on tensile strength absorption yield stress (TEAYS) of paper as compared to a non-starch control and Cato 15[a].

| Treatment and DS | Elongation at break inch | Strain at break % | Energy at break inch-lb. | TEAYS psi |
|---|---|---|---|---|
| No starch added | | | | |
| Control | 0.095 | 2.38 | 0.95 | 4591 |
| Starch added to 0.91% level (20 lb. ton$^{-1}$ dry fiber) | | | | |
| Cato 15 (0.035) | 0.135 | 3.38 | 1.48 | 4761 |
| Corn (0.031) | 0.105 | 2.63 | 1.23 | 5656 |
| Corn (0.053) | 0.104 | 2.61 | 1.19 | 5579 |
| Pea (0.026) | 0.109 | 2.72 | 1.14 | 4802 |
| Pea (0.046) | 0.109 | 2.72 | 1.18 | 5371 |
| WB[b](0.051) | 0.128 | 3.21 | 1.49 | 5645 |

[a]All values are averages of ten determinations.
[b]Waxy barley.

Conclusions

The aqueous alcoholic alkaline method, as outlined above, may be used for cationization and anionization of normal and high amylose starches and, especially, of waxy starches.

In this binary solvent system, the use of a miscible organic solvent, especially alcohols, facilitates the mixing of cationic reagent with water and the starch granules, thus reducing any diffusion-related mass transfer problems. The use of an organic solvent also eliminates the need for an inhibitor which is normally employed for preventing alkali-induced gelatinization in an aqueous environment especially for waxy starches. The present process retains the granularity of cationized waxy starches which facilitates separation, drying and subsequent applications in papermaking.

The present process provides for economical solvent recovery by distillation and recycling of the reagents with less pollution so that processing costs are reduced. Since the process can be a continuous one, it is possible to further lower the production costs. The present cationization process can be combined with other chemical treatments of starch, such as the addition of phosphate salts to the reaction mixture, to produce an amphoteric starch by combining the cationization and phosphorylation reactions.

The present invention includes processes for preparing amphoteric starches, namely by cationization and phosphorylation, which can be performed simultaneously or sequentially in an aqueous alkaline solvent without drying and heating for the phosphorylation step. A high reaction efficiency can be obtained in a short reaction time and with a low energy input.

Embodiments of the invention in which an exclusive property or privilege is claimed are defined as follows:

1. A wet method for the cationization of intact starch granules while inhibiting gelatinization of the intact starch granules comprising mixing the starch with a liquid and cationizing the starch in the said mixture under alkaline conditions, characterized in that the liquid is a mixture consisting of water and one non-aqueous, water miscible solvent, wherein gelatinization of the starch is inhibited by cationizing the starch at a temperature between 30°–80° C. in said mixture.

2. A method according to claim 1 wherein the starch is mixed with the liquid mixture at a starch to water ratio in the range 1:3 to 3:1 by weight.

3. A method according to claim 2 wherein the mixture comprises water and an organic solvent.

4. A method according to claim 3 wherein the organic solvent is an alcohol.

5. A method according to claim 4 comprising preparing a reaction mixture of the starch in the liquid mixture, heating the reaction mixture, adding a cationizing reagent to the reaction mixture and heating the reaction mixture with the cationizing reagent.

6. A method according to claim 4 wherein the alcohol is selected from the group consisting of ethanol, 1-propanol, 2-propanol and methanol.

7. A method according to claim 6 wherein the alcohol is ethanol and is present in a concentration in the range 75% to 35% alcohol relative to total water and alcohol.

8. A method according to claim 6 wherein the starch is corn starch and the alcohol is 2-propanol, the alcohol being present in a concentration in the range 55% to 65% alcohol relative to total water and alcohol.

9. A method according to claim 6 wherein the starch is selected from the group consisting of pea starch and waxy barley starch and alcohol is 2-propanol, the alcohol being present in a concentration in the range 35% to 45% alcohol relative to total water and alcohol.

10. A method according to claim 4 wherein the starch is mixed with the alcohol and subsequently mixed with alkali and a cationic reagent.

11. A method according to claim 1 wherein the solvent has a boiling point less than that of water, and comprising the further step of recovering the solvent by distillation.

12. A wet method for the cationization of a waxy starch comprising mixing the starch with a liquid and cationizing the starch in the said mixture under alkaline conditions at a temperature between 30°–80° C., wherein the liquid is a mixture including water, a non-aqueous, water miscible solvent and an alkali, and characterized by the absence of a further gelatinization inhibitor.

13. A method of producing amphoteric starch comprising mixing starch with a liquid mixture comprising water and a non-aqueous, water miscible solvent and cationizing the starch in the said mixture under alkaline conditions, and anionizing the starch in the liquid mixture.

14. A method according to claim 13 comprising simultaneously cationizating and anionizing the starch in the liquid mixture.

15. A method according to claim 13 comprising sequentially cationizating and then anionizing the starch in the liquid mixture.

16. A method according to claim 13, wherein the step of anionizing the starch comprises phosphorylation of the starch.

17. A method according to claim 13, wherein the starch is anionized by an anionizing agent comprising a phosphate salt selected from the group consisting of tripolyphosphate, hexametaphosphate and pyrophosphate alkali metal salts.

18. A method according to claim 17 comprising solubilizing the phosphate salt in water and subsequently mixing the salt and water with an alkali and the organic solvent.

* * * * *

UNITED STATES PATENT AND TRADEMARK OFFICE
CERTIFICATE OF CORRECTION

PATENT NO. : 5,827,372  
DATED : October 27, 1998  
INVENTOR(S) : Prakash R. Bhirud, et al.

Page 1 of 2

It is certified that error appears in the above-identified patent and that said Letters Patent is hereby corrected as shown below:

On the title page item [54], should read -- AQUEOUS ALCOHOLIC ALKALINE......

On the title page item [73], should read -- GrainTech Consulting Inc. where GrainTech is a single word with G and T being capitalized and includes the term Inc.

The title page item [56], under other publicatios

| | | |
|---|---|---|
| Craig, S.A.S.............Jane, J. 1987.. | should read -- | Craig, S.A.S.... ...........Jane, J. L. 1987..... |
| Hellwig, G.................................................ether........ | should read -- | Hellwig, G.................................................ethers.......... |
| Hernandez, H.R............................................paper.......... | should read -- | Hernandez, H.R............................................papers.......... |
| Lim, W.J. ................................................starch preparation. | should read -- | Lim, W.J. ................................................starch preparation and effect on paper strength. |
| Marton, J. ................................in fine-cationic starch interaction...... | should read -- | Marton, J. ................................in fines-cationic starch interactions.......... |
| Marton, J. .................................................fiber.................... | should read -- | Marton, J. .................................................fibers.................... |
| Mazzarella, E.D. ..................................................binder.......... | should read -- | Mazzarella, E.D. and Hickey, L.J. ..................................binders......... |
| Valle, G.D.  ...............Use of twin.... | should read -- | Della Valle, G.  ...............use of a twin.... |
| Lim, S. ...................and posting................ | should read -- | Lim, S. ...................and pasting.... |

UNITED STATES PATENT AND TRADEMARK OFFICE
CERTIFICATE OF CORRECTION

PATENT NO. : 5,827,372
DATED : October 27, 1998
INVENTOR(S) : Prakash R. Bhirud, et al.

It is certified that error appears in the above-identified patent and that said Letters Patent is hereby corrected as shown below:

Column 4 Line 13    Experiment should read-- Experiment 1

Column 5 Line 16    ....44.1 9)...... should read-- ....44.1 g)......

Signed and Sealed this

Twenty-seventh Day of July, 1999

Attest:

Q. TODD DICKINSON

*Attesting Officer*    Acting Commissioner of Patents and Trademarks